United States Patent [19]

Dick et al.

[11] Patent Number: 5,484,825
[45] Date of Patent: Jan. 16, 1996

[54] DISPERSIBLE ARTICLES

[75] Inventors: Richard J. Dick, Columbus; Nancy J. Fulton, Powell; James P. Pfau, Columbus, all of Ohio; Philip E. Bailey; John D. Booton, both of Bristol, Tenn.

[73] Assignee: Battelle Memorial Institute, Columbus, Ohio

[21] Appl. No.: 122,753

[22] Filed: Sep. 14, 1993

Related U.S. Application Data

[63] Continuation of Ser. No. 808,571, Dec. 17, 1991, abandoned, which is a continuation-in-part of Ser. No. 645,623, Jan. 25, 1991, abandoned.

[51] Int. Cl.$^6$ .................................................. C09D 7/00
[52] U.S. Cl. ........................ 524/35; 427/342; 524/52; 524/53
[58] Field of Search .................... 524/17, 35, 47, 524/51, 52, 53, 56; 427/342

[56] References Cited

U.S. PATENT DOCUMENTS

| | | | |
|---|---|---|---|
| 3,661,695 | 5/1972 | Berliner | 428/913 X |
| 3,867,324 | 2/1975 | Clendinning et al. | 524/382 X |
| 3,901,838 | 8/1975 | Clendinning et al. | 524/258 X |
| 3,934,587 | 1/1976 | Gordon | 428/524 X |
| 3,935,141 | 1/1976 | Potts et al. | 524/357 X |
| 3,952,347 | 4/1976 | Comerford et al. | 428/533 X |
| 4,035,540 | 7/1977 | Gander | 428/913 X |
| 4,067,836 | 1/1978 | Potts et al. | 524/528 X |
| 4,372,311 | 2/1983 | Potts | 428/507 X |
| 4,397,984 | 8/1983 | Wendel et al. | 428/514 X |
| 4,521,494 | 6/1985 | Mani | 428/514 |
| 4,620,999 | 11/1986 | Holmes | 428/520 X |
| 4,892,787 | 1/1990 | Kruse et al. | 428/514 X |
| 4,929,495 | 5/1990 | Stanislawczyk | 428/510 X |
| 4,999,239 | 3/1991 | Iacoviello et al. | 428/514 X |

*Primary Examiner*—Jenna L. Davis
*Attorney, Agent, or Firm*—Mueller and Smith

[57] ABSTRACT

The present invention is directed to a water-resistant, aqueous base-dispersible article which comprises a pulp-filled binder, one of which is an ethylenically unsaturated carboxylated (e.g. acrylic) polymer soluble in base, the other of which is water-resistant. Accordingly, the pulp can be water-resistant while the binder is base-dispersible or the converse can be true. Cellulosic and polymeric pulp are ideally suited for filling an base-soluble acrylic polymer. Water-soluble resins can be incorporated into the article for controlling the properties for special purposes. The method for forming such an article comprises yet another aspect of the present invention.

11 Claims, No Drawings

5,484,825

DISPERSIBLE ARTICLES

This application is a continuation of application U.S. Ser. No. 07/808,571, filed Dec. 17, 1991, now abandoned, which is a continuation-in-part of application U.S. Ser. No. 07/645,623, filed Jan. 25, 1991, now abandoned, the disclosures of which are expressly incorporated herein by reference.

BACKGROUND OF THE INVENTION

The present invention relates to structural and informational articles that readily disperse (lose mechanical integrity and preferably dissolve) upon contact with aqueous base.

Many articles in everyday use cause unwanted bulk in landfills due to their inability to biodegrade, e.g. polystyrene cups. A variety of current so-called biodegradable materials actually do not degrade in landfills due to the lack of oxygen and moisture reaching such materials as they become buried ever deeper in the landfills. Even some materials that can be recycled (e.g. polyethylene terephthalate or PET bottles) cannot be economically recycled due to the inability to remove the paper labels from the bottles. Additional packaging items that cause disposal problems include body-waste bags which can be used to store specimen samples or are used for receipt of body wastes. Even though the contents of the bags may be biodegradable, the packaging is not.

One proposal for making disposable articles is to coat a water soluble polymer with a degradable polymer such as poly(3-hydroxybutyrate) (U.S. Pats. Nos. 4,372,311 and 4,620,999). Other approaches include laminating biodegradable barrier films to non-biodegradable materials (U.S. Pats. Nos. 3,661,695, 3,934,587, and 3,952,347).

Ideally, the packaging or informational item (e.g. a label) possesses the requisite properties to withstand its intended use, such as a hot cup for retaining hot coffee, hot tea, hot chocolate, or the like; yet which under specified conditions can be readily dispersed for disposal and/or recovery and recycle of the materials. For present purposes, a "dispersible" article is one which can be dissolved or otherwise sufficiently solvated in either 14% $NH_4OH$ or a 5% Alconox solution so that it loses its mechanical integrity and is in a form that can be safely disposed and/or subjected to recovery procedures.

BROAD STATEMENT OF THE INVENTION

The present invention is directed to a water-resistant, aqueous base-dispersible article which comprises a pulp-filled binder, one of which is an ethylenically-unsaturated carboxylated (e.g. acrylic) polymer soluble in base, the other of which is water-resistant. Accordingly, the pulp can be water-resistant while the binder is base-dispersible, or the converse can be true. Cellulosic and polymeric pulp are ideally suited for filling a base-soluble carboxylated polymer. The time required for the article to be dispersed can be controlled by correlating amounts of and types of water-compatible polymers (e.g. polyvinyl alcohol) included in the formulations for making the inventive articles. The method for forming such an article comprises yet another aspect of the present invention.

Advantages of the present invention include an article that is ideally suitable for use in packaging and informational utilization, yet which can be readily dispersed (or redispersed) upon contact with aqueous base. Yet another advantage is an article which does not contribute to the burgeoning landfill burden placed on today's society. A further advantage is the ability to formulate unique compositions to control the degree of water-resistance and alkali dispersibility of the article. These and other advantages will be readily apparent to those skilled in the art based upon the disclosure contained herein.

DETAILED DESCRIPTION OF THE INVENTION

The article of the present invention possesses sufficient mechanical integrity to be useful as container, informational article, or the like, yet collapses in the presence of aqueous base (e.g. alkali), for safe disposal. The article comprises a pulp and a binder, one of which is an ethylenically unsaturated carboxylated polymer soluble in base, the other of which is water-resistant, i.e. for present purposes, is resistant for 24 hours to ambient temperature to 105° F. water; or 5 hours resistance to 250° F. water. With respect to carboxylated polymers soluble in aqueous base, a wide range of commercial polymers are available though synthesis of specially adapted polymers can be practiced. A few of the commonly used monomers include, for example, methyl methacrylate, ethyl acrylate, butyl acrylate, 2-ethylhexyl acrylate, methacrylic acid, acrylic acid, styrene, alpha-methyl styrene, vinyl toluene, acrylonitrile, vinyl acetate, and hydroxyethyl methacrylate. Methyl methacrylate, styrene, alpha-methyl styrene, and acrylonitrile impart hardness and increase the glass transition temperature ($T_g$) of the polymer; ethyl acrylate, 2-ethylhexyl acrylate, and butyl acrylate reduce the hardness and $T_g$; methacrylic acid and acrylic acid confer alkali, i.e. ammonia, sensitivity or, at high concentrations, water solubilization. Sensitivity to base facilitates the dispersible feature of the inventive article.

Within homologous polymer series, $T_g$ can be varied by changing the ratio of the high $T_g$-contributing monomer (e.g. the hard monomer, methyl methacrylate) to the low $T_g$-contributing monomer (e.g. the soft monomer, butyl acrylate). Increasing the $T_g$ increases hardness as determined by measuring indentation hardness or Rockwell hardness. The increase in $T_g$ is accompanied by an increase in the elastic modulus also. Accordingly, the formulator has the ability to impart a wide variety of properties on the article, making it especially useful in a variety of applications, particularly in the container field.

Synthetic alkali-soluble resins are characterized by high acid values (100–450), low molecular weight ($\overline{M}_n$<8,000), and softening points (100°–180° C.). Other ingredients in the formulation can provide requisite performance properties depending on use of the article. It will be appreciated that the binder can be formulated from such aqueous base-soluble acrylic polymer, or the pulp or reinforcement portion of the article can be so formulated. In fact, a mixture also is possible of base-soluble acrylic polymer reinforcement and binder. A water-resistant component would be necessary under such circumstances. Divalent metal ions, notably zinc and zirconium, can be used in forming an acrylic complex for improving the resistance of the article to a variety of external factors.

The water-resistant component of the inventive article can be virtually any item previously used as a binder or pulp/reinforcement. In the reinforcement area, a variety of cellulosics are ideally adapted for serving as the pulp or reinforcement portion of the article. Such pulp can be provided in a paper or web form, or can be in loose pulp for combining with the binder and forming a reinforced or pulp-filled article. Synthetic reinforcement also can be used, including, for example, polyethylene terephthalate, polyesters, vinyl polymers and copolymers, epoxy resins, polyurethane resins, amine and phenol formaldehyde resins, thermosetting acrylic copolymers, polysulfone resins, polyamine resins, glass fiber and pulp; carbon fiber and pulp; polyolefins, polyamides, polyimides, polyketones, fluoropolymers, organometallics, polyphenylene sulfide, melamines, and the like. It will be appreciated that a variety of these materials also can be used to form the binder or mixtures of binder and pulp can be formulated therefrom as those skilled in the art will appreciate.

Depending on uses of the article intended, a variety of conventional additives can be incorporated. These include, for example, opacifying pigment, tinctorial pigments, flow and leveling agents, anti-foam agents, bacteriastats and fungistats, perfumants, and the like, and mixtures thereof.

A variety of additional monomers, polymers, and copolymers can be incorporated into the article for enhancing its water-resistance or base-dispersibility. Polyvinyl alcohol or other water-compatible agent can be added to control the rate of dispersibility of the article in aqueous base (e.g. alkali) by correlating the amount and type of agent (or blend of agents) incorporated into the formulation. For that matter, the article can be coated with a water-resistant coating (e.g. the internal surface of a container) to impart added water resistance during use. The entire container could be so coated if desired. The skilled artisan will appreciate such special effects that can be achieved thereby.

Bases which can be used to disperse the articles include ammonia; alkali metal (Group 1a including Li, Na, K, Rb and Cs) and alkaline earth metal (Group 2a, including, Be, Mg, Ca, Sr, and Ba) salts (e.g. oxides, hydroxides, etc.); basic surfactants, including fatty acid salts (e.g. sodium salts of palmitic acid); amine oxides; imidazolines and their derivatives; and the like and mixtures thereof.

As noted before, disposable containers are believed to be a prime field for use of the dispersible articles disclosed herein. Such containers can include medical containers for body fluids and wastes, or can be hot cups intended for coffee and like drinks. Labels for application to PET and other plastic bottles also may be a quite advantageous use of the inventive dispersible articles since paper label removal from such bottles presents a major problem in their recycling presently. Them is almost no end of articles that can be suitably formulated for designed use periods and functions, yet which can be dispersed in aqueous alkali for disposal and handling thereafter.

The following examples show how the present invention has been practiced, but should not be construed as limiting. All citations referred to herein are expressly incorporated herein by reference.

EXAMPLES

EXAMPLE 1

The following alkali-soluble resin formulations were made:

| Formulation No. | Ingredient* | Amount (wt % on solids) |
|---|---|---|
| 27-1 | Rhoplex B-505 | 100 |
|  | Dowanol EB | 12.2 |
|  | Texanol | 3.0 |
|  | $H_2O$ | 82.2 |
| 25-1 | Acrysol WS-50 | 100 |
|  | IPA | 13 |
|  | $H_2O$ | 50.2 |
|  | 14% $NH_4OH$ (adjust to pH 8.5) | — |
| 29-1 | Acrysol WS-50 | 50 |
|  | Acrysol WS-24 | 50 |
|  | IPA | 30.1 |
|  | $H_2O$ | 46.1 |
|  | 14% $NH_4OH$ (adjust to pH 7.6) | — |
| 28-1 | Rhoplex B-832 | 100 |
|  | Dowanol EB | 12 |
|  | Texanol | 3 |
|  | $H_2O$ | 82 |
|  | 14% $NH_4OH$ (adjust pH to 9) | — |

*Rhoplex B-505 is a zinc-complexed acrylic polymer emulsion (milky white liquid, 40% solids content, 9.0 lb/U.S. gal at 25° C., pH 7.7, Brookfield viscosity at 25° C. at 60 rpm of 50 cps), Rohm and Haas Company, Philadelphia, Pa.
Rhoplex B-832 is a modified acrylic, zinc-complexed polymer latex (milky liquid, 40% solids content, 8.9 lb (U.S. gal at 25° C., pH 9.2, Brookfield viscosity at 60 rpm of 50 cps), Rohm and Haas Company.
Acrysol WS-50 is an acrylic polymer supplied in water (white to slightly translucent liquid, 38% solids content, pH 7.1, 8.8 lbs/gal, $T_g$ 36° C.), Rohm and Haas Company.
Acrysol WS-24 is an acrylic copolymer dispersion (translucent, milky white fluid, 36.0% solids content, pH 7.0, 8.8 lb/gal. $T_g$ 36° C.), Rohm and Haas Company.
Dowanol EB is ethylene glycol butyl ether, Dow Chemical USA, Midland, Michigan.
Texanol is 2,2,4-trimethyl-1,3-pentanediol, Kodak Chemicals.
IPA is isopropyl alcohol.
$H_2O$ is deionized water.

These formulations were spray applied to carboxymethyl cellulose tissue, cured, and subjected to 108° F. water, 5% Alconox detergent solution, and 14% $NH_4OH$ in order to assess their resistance thereto. The following results were recorded.

TABLE 1A

| Formulation No. | 108° F. Water Exposure Time | | |
|---|---|---|---|
|  | 45 min. | 2.5 hr. | 22 hr. |
| 25-1 | No Change | No Change | Some localized blistering due to permeation of water into the paper |
| 27-1 | Slight curing around the edges | Same as after 45 min. | Still slightly cured but no signs of blistering or dissolving of the polymer |
| 28-1 | No Change | No Change | No Change |
| 29-1 | Sample began to flake | Sample began to flake | Sample was swollen but |

TABLE 1A-continued

| Formulation | 108° F. Water Exposure Time | | |
|---|---|---|---|
| No. | 45 min. | 2.5 hr. | 22 hr. |
| | | | still in one piece, with some coating dissolved in the water. |

TABLE 1B

| Formu- lation | 5% Alconox Solution Exposure Time | | |
|---|---|---|---|
| No. | 5 min. | 60 min. | 3.5 hr. |
| 25-1 | No Change | No Change | Some resin dissolving |
| 27-1 | No Change | Slight swelling | Loss of mechanical integrity |
| 28-1 | No Change | No Change | Some resin dissolving |
| 29-1 | No Change | Slight swelling | Slight swelling |

TABLE 1C

| Formulation | 14% $NH_4OH$ Exposure Time | | |
|---|---|---|---|
| No. | 5 min. | 20 min. | 60 min. |
| 25-1 | Slight swelling | Loss of mechanical integrity | — |
| 27-1 | Sample began to flake | Slight swelling | Loss of mechanical integrity |
| 28-1 | No change | No change | No change |
| 29-1 | Sample began to flake | Slight swelling | Loss of mechanical integrity |

These results show that these formulations can provide a degree of resistance to hot water, yet lose mechanical integrity upon exposure to a base.

The formulations were tested by exposure to 250° F. hot water. Formulation 27 possessed good resistance while Formulation 28 possessed fair resistance. The other two formulations were unacceptable. The formulations again were tested by exposure to 100% relative humidity at 75° F. At the end of two hours, Formulation 29 exhibited slight tackiness, Formulations 25 and 27 exhibited some flexibility, while Formulation 28 exhibited no change. These results did not materially vary for the next 48 hours.

Cellulose fiber then was dispersed into Formulation 27 at a loading of 4.9 parts per 100 parts of resin with Dow 59 silicone defoamer added to reduce foaming. The cured reinforced film was brittle with separation between the resin and fiber. Using Formulation at a loading of 6.7 parts per 100 parts of resin and the anti-foam agent, the cured reinforced film was flexible and tough. A loading of 10 parts per 100 parts of resin was tried with Formulation 25, but the product was not as flexible as before nor as tough. It is surmised that the loading was too high.

A "label" was made from the formulations which were soaked into approximately 3×5 inch sections of paper and applied to PET bottles. These labels were cured at 104° F. and the samples allowed to cool. Formulations 25 and 29 delaminated after flexing of the bottle. Accordingly, two different adhesives were used to promote adhesion between the labels and the PET bottles. Adhesives were applied with 1×1 inch samples of each resin/paper combination. With a polyacylate pressure sensitive adhesive (3M Adhesive Transfer Tape, a double release acrylic tape, Minnesota Mining and Manufacturing Company), Formulations 25 and 29 had excellent adhesion, Formulation 27 exhibited fair adhesion, while Formulation 28 exhibited poor adhesion probably due to being too rigid. Using DEVCON DUCO cement (a solvated cellulosic acetate polymer in ethyl acetate Devcon Corp., Danvers, Mass. 01923) Formulations 25 and 29 exhibited fair adhesion while Formulations 27 and 28 were too stiff to exhibit good adhesion.

In order to control the dispersibility of the resins and pulp, a 10% solution by weight of polyvinyl alcohol (PVA) in water was made and then blended with the formulations at a solids ratio of 4:1 (acrylic:PVA). PVA was not compatible with Formulation 28. The remaining blends were spray-applied to water-soluble paper and tested against 108° water and 14% ammonia. At the end of 10 minutes, Formulation 27 totally dissolved in the ammonia while Formulations 25 and 29 exhibited some swelling in dissolved resin. At the end of 30 minutes, all samples had dissolved. At the end of 25 minutes in 108° F. deionized water, samples 25 and 29 exhibited slight flexibility while Formulation 27 exhibited no change. A the end of 45 minutes, the results were the same except that the water containing Formulation 29 began to turn cloudy. At the end of 75 minutes, Formulation 25 started to curl, Formulation 27 was slightly flexible, while Formulation 29 had not changed. At the end of 24 hours, Formulation 25 was soft and curled, Formulation 27 was flexible and soft, while Formulation 29 was soft. It is concluded based on these results that it is possible to reduce the dissolution time and still maintain water resistance. In order to further adjudge the suitability of these formulations in making hot cups or containers, they were exposed to hot coffee (80°–142° F.) for 45 minutes with good resistance resulting; chocolate at an initial temperature of 152° F. and exhibited good resistance; lipstick which did not adhere to the samples; tea at 90°–1520° F. where resistance was lacking in samples not coated with the water resistant formulation; and saliva to which the samples were resistant.

EXAMPLE 2

This example focused on correlating average molecular weight and dispersion time. Polyvinyl alcohol (PVA) representing three molecular weight ranges was blended with the following alkali soluble resin formulation.

TABLE 2A

| Ingredient | Wt % |
| --- | --- |
| Distilled Water | 22.7 |
| Dowanol EB | 8.4 |
| Texanol | |
| Rhoplex B505 (40% solids) | 68.9 |

The blends were 7 wt-% resin/30 wt-% PVA. Each blend was coated onto water-dispersible paper and cured. The sensitivity of the paper samples to alkali dispersibility was estimated by recording the time required for an alkali solution (14% ammonium hydroxide) to penetrate the papers and react with a phenolphthalein indicator. The following results were obtained.

TABLE 2B

| PVA Molecular Weight | Time to Indicator Color Change (Min.) | Paper Thickness (mils) |
| --- | --- | --- |
| Control-No PVA | 0.25–.5 | 15 |
| 13,000–23,000 | 0.5 | 10–12 |
| 31,000–50,000 | about 2 | 11–14 |
| 124,000–186,000 | about 17 | 15–17 |

The above-tabulated data establishes that water soluble resin molecular weight used to control dispersion time of the inventive dispersible articles. These data show that dispersion time increases with increasing average molecular weight of the water soluble (PVA) resins.

EXAMPLE 3

The influence of additional water-soluble and water-insoluble polymers in alkali was studied by monitoring dissolution time (DT) of two different disposable packaging material (DPM) formulations containing three different water-soluble resins and one water-insoluble resin. One DPM was a rapid dissolution formulation (<0.1 min/mil) while the other was a slow dissolution formulation (3.4 min/mil). Each water-soluble resin was tested at different molecular weights or, in the case of the copolymer, at varying comonomer ratios. The following additive resins were employed:

I. Water-Soluble Resins
  A. Poly(vinyl alcohol) (PVA)
    1. 13,000–23,000 molecular weight
    2. 31,000–50,000 molecular weight
    3. 124,000–186,000 molecular weight
  B. Poly(vinyl pyrrolidone) (PVP)
    1. 10,000 avg. molecular weight (L)
    2. 40,000 avg. molecular weight (M)
    3. 360,000 avg. molecular weight (H)
  C. Poly(vinyl pyrrolidone-co-vinyl acetate) copolymer (PVA-VA)
    1. 70/30 (VP/VA)
    2. 50/50 (VP/VA)
    3. 30/70 (VPNA)
II. Water-Insoluble Resin
  A. Rhoplex WL-92 acrylic polymer emulsion (light yellow, 42% solids content, 8.6 lb/U.S. gal at 25° C., pH 7.5, acid no. 26, sp. gr. 1.032, 26° C. min. film forming temperature, Brookfield viscosity at 25° C. (#3 spindle, 60 rpm) 200–600 cps), Rhom and Haas Company, Philadelphia, Pa.

The two different formulations employed and the test procedures used are set forth below:

| WS-50 Slow Dissolution Formulation (3.4 min/mil) | |
| --- | --- |
| Acrysol WS-50 | 83 wt % |
| IPA | 4.1 wt % |
| $H_2O$ | 12.4 wt % |
| 14% $NH_4OH$ | adjust to pH 8.4 |
| B-505 Fast Dissolution Formulation (<0.1 min/mil) | |
| Rhoplex B-505 | 72 wt % |
| Dowanol EB | 3.5 wt % |
| Texanol | 0.9 wt % |
| $H_2O$ | 23.6 wt % |

Testing Procedures

1. Water-dispersible paper was coated with each blend and cured.
2. The sensitivity of the paper samples to alkali dispersibility was estimated by recording the time required for an alkali solution (14% $NH_4OH$) to penetrate the papers and react with phenolphthalein indicator.
3. By using slightly acidic water, water sensitivity was measured using the same penetration procedure.
4. Selected paper samples from Step 1 were coated with a water/alkali-insoluble polymer.

The results recorded are set forth below in Tables 3–7 which list the average values for three data points which were collected for each run. The tables follow with observations on the data listed after each.

TABLE 3

Dispersion Time of Blends of Alkali-Soluble Polymer (ASP) with PVP-VA Copolymer

| Exp. # | Ratio PVP/VA | % ASP Subst. | Type of ASP | Avg. Rate Min./Mil.[1] | Std. |
| --- | --- | --- | --- | --- | --- |
| 1 | 70/30 | 10 | WS-50 | 8.1 | 0.2 |
| 2 | 70/30 | 30 | WS-50 | 0.6 | 0.4 |
| 3 | 70/30 | 50 | WS-50 | 0.2 | 0.1 |
| 4 | 70/30 | 10 | B-505 | 10.4 | 0.8 |
| 5 | 70/30 | 30 | B-505 | 7.2 | 1.6 |
| 6 | 70/30 | 50 | B-505 | 0.0 | 0.0 |
| 7 | 50/50 | 10 | WS-50 | 6.9 | 0.2 |
| 8 | 50/50 | 30 | WS-50 | 1.9 | 0.2 |
| 9 | 50/50 | 50 | WS-50 | 0.4 | 0.0 |
| 10 | 50/50 | 10 | B-505 | 1.9 | 1.1 |
| 11 | 50/50 | 30 | B-505 | 1.1 | 0.7 |
| 12 | 50/50 | 50 | B-505 | 0.1 | 0.1 |
| 13 | 30/70 | 10 | WS-50 | 4.6 | 0.4 |
| 14 | 30/70 | 30 | WS-50 | 1.4 | 0.4 |
| 15 | 30/70 | 50 | WS-50 | 0.5 | 0.1 |
| 16 | 30/70 | 10 | B-505 | 0.1 | 0.1 |
| 17 | 30/70 | 30 | B-505 | 0.2 | 0.2 |
| 18 | 30/70 | 50 | B-505 | 0.2 | 0.1 |

[1]Control values are:
WS-50: 3.4 min./mil
B-505: <00.1 min./mil

Observations

1. The presence of 10 percent PVP/VA increases the dissolution time (DT) over that of the unmodified alkali-soluble polymer (ASP). This relationship is especially true for Rhoplex B-505.
2. The ratio of PVP to VA and the percent of ASP influence the dispersion time.

3. As the PVP/VA ratio decreases, the dispersion time increases.

4. As the percent of ASP increases, the dispersion time also increases.

TABLE 4

Dispersion Time of Blends af Alkali-Soluble Polymer (ASP) with PVOH

| Exp. # | PVOH M.W. | % ASP Subst. | Type of ASP | Avg. Rate Min./Mil.[1] | Std. |
|---|---|---|---|---|---|
| 19 | L | 10 | WS-50 | 0.8 | 0.0 |
| 20 | M | 10 | WS-50 | <0.1 | 0.0 |
| 21 | H | 10 | WS-50 | 0.4 | 0.2 |
| 22 | L | 30 | WS-50 | <0.1 | 0.0 |
| 23 | M | 30 | WS-50 | <0.1 | 0.0 |
| 24 | H | 20 | WS-50 | <0.1 | 0.0 |
| 25 | L | 50 | WS-50 | <0.1 | 0.0 |
| 26 | M | 50 | WS-50 | <0.1 | 0.0 |
| 27 | H | 50 | WS-50 | <0.1 | 0.0 |
| 28 | L | 10 | B-505 | <0.1 | 0.0 |
| 29 | M | 10 | B-505 | <0.1 | 0.0 |
| 30 | H | 10 | B-505 | <0.1 | 0.0 |
| 31 | L | 30 | B-505 | <0.1 | 0.0 |
| 32 | M | 30 | B-505 | <0.1 | 0.0 |
| 33 | H | 30 | B-505 | <0.1 | 0.0 |
| 34 | L | 50 | B-505 | <0.1 | 0.0 |
| 35 | M | 50 | B-505 | <0.1 | 0.0 |
| 36 | H | 50 | B-505 | <0.1 | 0.0 |

[1]Control Values are:
WS-50: 3.4 min./mil.
B-505: <0.1 min./mil.

Observations

1. PVOH exhibits no influence on the dispersion time of Rhoplex B-505 formulations.

2. The presence of PVOH decreases DT of Acrysol WS-50 (at 10, 30, and 50 percent levels of PVOH.

3. At an addition level of 10 percent PVOH, the low molecular weight PVOH possesses a longer DT than those of the medium or high molecular weight PVOH materials.

4. It follows from Observation No. 3, that the greatest control can be obtained by electing an addition level of 10 percent PVOH.

TABLE 5

Dispersion Time of Blends of Alkali-Soluble Polymer (ASP) with PVP

| Exp. # | PVP M.W. | % ASP Subst. | Type of ASP | Avg. Rate Min./Mil.[1] | Std. |
|---|---|---|---|---|---|
| 37 | L | 10 | WS-50 | 0.4 | 0.0 |
| 38 | M | 10 | WS-50 | 0.4 | 0.1 |
| 39 | H | 10 | WS-50 | 0.6 | 0.1 |
| 40 | L | 30 | WS-50 | 0.1 | 0.0 |
| 41 | M | 30 | WS-50 | 0.4 | 0.1 |
| 42 | H | 30 | WS-50 | 0.3 | 0.5 |
| 43 | L | 50 | WS-50 | 0.2 | 0.0 |
| 44 | M | 50 | WS-50 | <0.1 | 0.0 |
| 45 | H | 50 | WS-50 | <0.1 | 0.0 |
| 46 | L | 10 | B-505 | <0.1 | 0.0 |
| 47 | M | 10 | B-505 | <0.1 | 0.0 |
| 48 | H | 10 | B-505 | <0.1 | 0.0 |
| 49 | L | 30 | B-505 | <0.1 | 0.0 |
| 50 | M | 30 | B-505 | <0.1 | 0.0 |
| 51 | H | 30 | B-505 | <0.1 | 0.0 |
| 52 | L | 50 | B-505 | <0.1 | 0.0 |
| 53 | M | 50 | B-505 | <0.1 | 0.0 |
| 54 | H | 50 | B-505 | 0.1 | 0.0 |

[1]Control Values are:
WS-50: 3.4 min./mil.
B-505: <0.1 min./mil.

Observations

1. The addition of PVP to the Rhoplex B-505 alkali soluble polymer (ASP) has no influence on the dispersion time.

2. The presence of PVP reduces the DT of Acrysol WS-50.

3. In Acrysol WS-50-based formulations, PVP exerts the greatest control of DT at addition levels of 10 and 30 percent.

4. In Acrysol WS-50 based formulations, molecular weight of the PVP does not have a significant influence.

TABLE 6

Dispersion Time of Blends of Alkali-Soluble Polymers[1] (ASP) with Water-Insoluble Resins (WIR)[2]

| Exp. # | Resin Name | % ASP Subst. | Avg. Rate Min./Mil. | Std. |
|---|---|---|---|---|
| 55 | WS-50 | 10 | 0.6 | 0.0 |
| 56 | WS-50 | 30 | 0.5 | 0.0 |
| 57 | WS-50 | 50 | 0.3 | 0.0 |
| 58 | B-505 | 10 | 0.0 | 0.0 |
| 59 | B-505 | 30 | 0.6 | 0.1 |
| 60 | B-505 | 50 | 0.8 | 0.1 |
| B-505 | Control | — | <0.1 | 0.0 |
| WS-50 | Control | — | 3.4 | 0.1 |

[1]Acrysol WS-50 and Rhoplex B-505, Rohm and Haas
[2]Rhoplex WL-92, Rohm and Haas Observations 1. In Acrysol WS-50 formulations, an increase in the amount of water-insoluble resin decreases DT.

2. In Rhoplex B-505 formulations, an increase in the amount of water-insoluble resin (90/10→70/50, ASP/WIR) increases DT.

TABLE 7

Protection Provided by Water-Insoluble Coating When Applied as Posttreatment[1]

| Exp[2] | Perm. Min. | /Mil | Perm. Rate | Perm. Min. | /Mil | Perm. Rate | Avg. Perm. Min./Mil | Std. |
|---|---|---|---|---|---|---|---|---|
| 1 | 13.5 | 10.0 | 1.4 | 9.5 | 9.0 | 1.1 | 1.2 | 0.1 |
| 1A | 371.0 | 14.0 | 26.5 | 341.0 | 13.0 | 26.2 | 26.4 | 0.1 |
| 19 | 7.0 | 9.0 | 0.8 | 8.7 | 9.0 | 1.0 | 0.9 | 0.1 |
| 19A | 175.2 | 13.0 | 13.5 | 175.2 | 13.0 | 13.5 | 13.5 | 0.0 |
| 37 | 3.2 | 13.0 | 0.2 | 6.0 | 11.0 | 0.5 | 0.4 | 0.1 |
| 37A | 331.0 | 17.0 | 19.5 | 331.0 | 15.0 | 22.1 | 20.8 | 1.3 |
| WS-50 | 18.5 | 12.5 | 1.5 | 32.0 | 12.0 | 2.7 | 2.1 | 0.6 |
| WS-50A | >325 | 16.5 |  | 325.8 | 16.0 | 20.4 | 20.4 | 0.0 |

[1]Water-insoluble coating was applied at 4 mils DFT (dry film thickness)
[2]Suffix "A" indicates application of water-insoluble coating.

Observations

1. Addition of a water-insoluble barrier coating (Rhoplex WL 92) applied after forming the article (as opposed to its use in blends as described in Table 5) greatly increases water resistance.
2. ASP/water-soluble polymer blends are equally susceptible to neat water and alkaline water.

Conclusions

In DPM (dispersible packaging materials) formulations based on acrylic resins, both water-soluble and water-insoluble resins can be added as modifiers to control DT (dispersion time). DT is influenced by several variables including molecular weight, polymer composition, blend ratio, and type of alkali-soluble resin.

A water-insoluble barrier coating is effective for increasing water resistance. The same material is less effective when used as a modifier resin in a blend. It is speculated that resin incompatibilities in the blends allow the water-insoluble resin to exist as domains and therefore, contribute less to water resistance. However, as a discrete barrier coating, the homogeneity of the resin dramatically increases water resistance.

Based on the above conclusions, it is obvious that the DPM formulator has a wide range of materials available for controlling dispersion time. This arsenal of materials will allow the design of DPM products to meet the most demanding requirements.

We claim:

1. A method for disposing of an article comprising the steps of:

(a) forming said article of an aqueous base-dispersible binder consisting essentially of the dried film of an acrylic polymer aqueous emulsion, and a water-resistant reinforcement dispersed in said binder; and (b) exposing said article to aqueous base to disperse said article in said base.

2. The method of claim 1 wherein said binder is soluble in base.

3. The method of claim 1 wherein said reinforcement is soluble in base.

4. The method of claim 1 wherein said reinforcement is in web form.

5. The method of claim 1 wherein said reinforcement is in fibrous form.

6. The method of claim 1 wherein said article is a container.

7. The method of claim 1 wherein said article is a label which has one side coated with a layer of an adhesive.

8. The method of claim 1 wherein said article is coated with a water-resistant coating.

9. The method of claim 1 wherein said article additionally contains a water-soluble component.

10. The method of claim 9 wherein the time for said article to disperse base is controlled by varying the molecular weight of said water-compatible component.

11. The method of claim 10 wherein said component is polyvinyl alcohol.

* * * * *

UNITED STATES PATENT AND TRADEMARK OFFICE
CERTIFICATE OF CORRECTION

PATENT NO. : 5,484,825
DATED : January 16, 1996
INVENTOR(S) : Richard J. Dick, Nancy J. Fulton, James P. Pfau, Philip E. Bailey, and John D. Booton It is certified that error appears in the above—identified patent and that said Letters Patent is hereby corrected as shown below:

Column 3, line 45, "Them" should be -- There --.

Column 5, line 55, "Formulation at" should be -- Formulation 25 at --.

Column 6, line 14, "polyacylate" should be -- polyacrylate --.

Column 6, line 65, "1520°F" should be -- 152°F --.

Column 7, line 64, "(VPNA)" should be -- (VP/VA) --.

Column 9, Table 4, line 1 of the title "af" should be -- of --.

Signed and Sealed this

Thirtieth Day of July, 1996

Attest:

BRUCE LEHMAN

Attesting Officer     Commissioner of Patents and Trademarks